US008527999B2

(12) United States Patent
Dessertenne et al.

(10) Patent No.: US 8,527,999 B2
(45) Date of Patent: Sep. 3, 2013

(54) METHOD, COMPUTER PROGRAM AND DEVICE FOR SUPERVISING A SCHEDULER FOR MANAGING THE SHARING OF PROCESSING TIME IN A MULTI-TASK COMPUTER SYSTEM

(75) Inventors: Franck Dessertenne, Colomiers (FR); Pierre Guirriec, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 258 days.

(21) Appl. No.: 13/018,883

(22) Filed: Feb. 1, 2011

(65) Prior Publication Data
US 2011/0202931 A1 Aug. 18, 2011

(30) Foreign Application Priority Data
Feb. 10, 2010 (FR) ...................................... 10 50932

(51) Int. Cl.
*G06F 9/46* (2006.01)
*H04L 1/00* (2006.01)
(52) U.S. Cl.
USPC ............ 718/104; 718/108; 718/107; 370/250
(58) Field of Classification Search
None
See application file for complete search history.

(56) References Cited

U.S. PATENT DOCUMENTS

| 5,535,416 | A | * | 7/1996 | Feeney et al. ................... 710/14 |
| 2004/0078543 | A1 | | 4/2004 | Koning et al. |
| 2006/0059491 | A1 | * | 3/2006 | Suzuki et al. ................. 718/100 |
| 2006/0107264 | A1 | * | 5/2006 | Schmidt et al. ............... 718/100 |

FOREIGN PATENT DOCUMENTS
FR 2 915 006 10/2008

OTHER PUBLICATIONS

French Preliminary Search Report issued Oct. 15, 2010, in French 1050932, filed Feb. 10, 2010 (with English Translation of Categories of Cited Documents).

* cited by examiner

*Primary Examiner* — Camquy Truong
(74) *Attorney, Agent, or Firm* — Oblon, Spivak, McClelland, Maier & Neustadt, L.L.P.

(57) ABSTRACT

The invention in particular has as an object supervising a scheduler for the management of processing time sharing in a multitask data-processing system comprising a computation unit having a standard execution mode and a preferred execution mode for executing a plurality of applications. The execution time for the said plurality of applications is divided into a plurality of periods and a minimal time for access per period to the said computation unit is determined for at least one application of the said plurality of applications. For at least one period, the said preferred execution mode is associated with the said at least one application and the said at least one application is executed according to at least the said minimal time for access to the said computation unit. For the said at least one period, the said standard execution mode is associated with the applications of the said plurality of applications and at least any one of the applications of the said plurality of applications is executed.

18 Claims, 5 Drawing Sheets

Fig. 2a
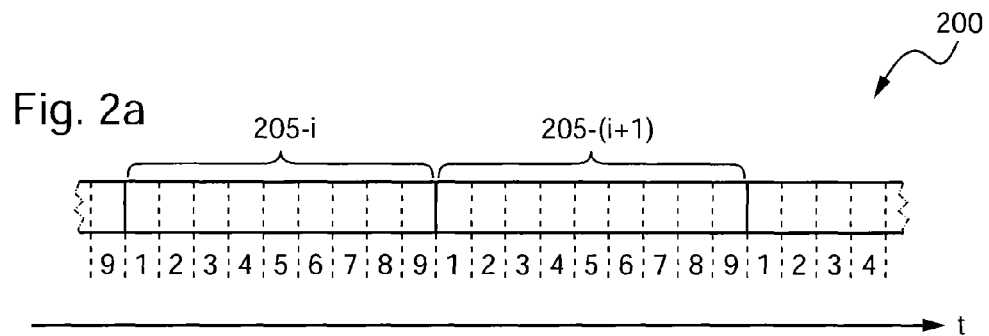
Fig. 2b
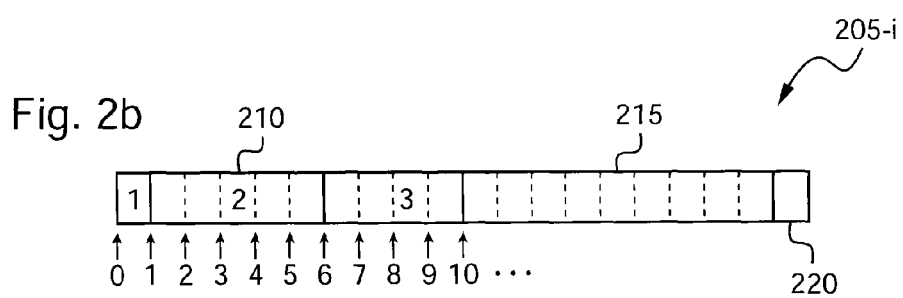
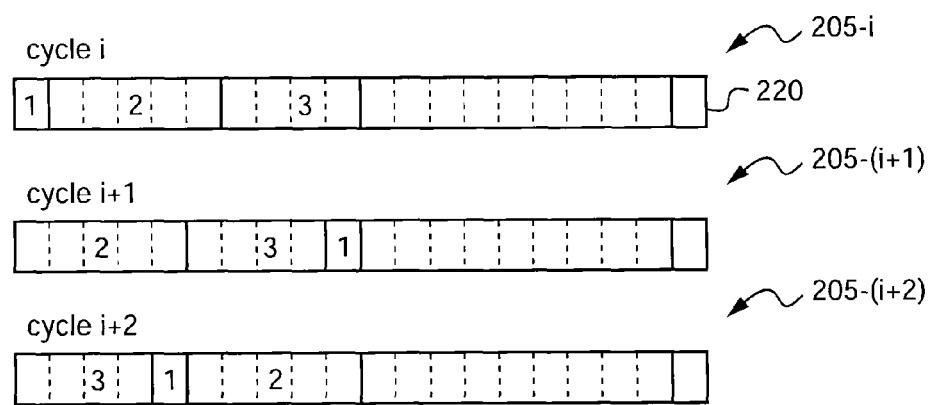
Fig. 3

METHOD, COMPUTER PROGRAM AND DEVICE FOR SUPERVISING A SCHEDULER FOR MANAGING THE SHARING OF PROCESSING TIME IN A MULTI-TASK COMPUTER SYSTEM

This invention relates to management of the resources of a data-processing system and more particularly a method, a computer program and a device for supervising a scheduler for the management of sharing of processing time, more particularly of the processor time, in a multitask data-processing system, especially in a multitask data-processing system on board an aircraft.

Modern aircraft more and more comprise electronic and data-processing systems in order to improve their performances and to assist the pilot as well as the members of the crew during their missions. Thus, for example, electric flight controls make it possible to reduce the mechanical complexity of transmitting commands to the actuators and therefore the weight of these control devices. Likewise, the presentation of pertinent information items allows the pilot to optimize the flight paths and to respond rapidly to any incident detected. Such information items are in particular speed, position, heading, weather and navigation data. There also are on-board information systems for collecting information items originating from different control and monitoring components of an aircraft in order to make it possible to establish a diagnosis and to facilitate maintenance operations. These systems generally comprise a communication interface for exchanging maintenance data with systems on the ground.

In order to improve the functionalities of the aircraft, reduce the weight of the electronic equipment items by virtue of a greater integration, reduce the costs and facilitate maintenance operations, the on-board data-processing systems more and more integrate generic modules using operating systems derived from real-time or standard multitask operating systems.

The functionalities of the data-processing systems on board aircraft thus use as much as possible generic computation and input/output resources in which they are implemented. Nonetheless, a segregation or partitioning system makes it possible to isolate each of the functionalities so that the failure of one function does not affect another.

Such computation resources, called computers in the remainder of the description, generally implement a multitask operating system such as LINUX (LINUX is a trademark). They thus allow execution of software applications having different criticality levels. A high priority level is assigned to the most critical applications so as to try to satisfy their time constraints, whatever the performance of the less critical applications may be (such systems generally do not make it possible to satisfy real-time constraints). The latter generally do not have a guarantee of minimal access to the computation resource (processor or CPU, abbreviation for Central Processing Unit in English terminology), which may be monopolized, partially or wholly, by more critical tasks.

More precisely, the processor time is divided among the software applications in the course of execution by a scheduler that uses different criteria in order to allocate slots for access to the processor to each software application. Typically, a scheduler may function according to two execution modes. In a first mode, corresponding to the standard use mode, called SCHED_OTHER under LINUX, the time is distributed according to a priority the value of which is managed dynamically. It is based on a priority criterion and a measurement of the execution time of the applications in order to implement a scheduling policy.

In a second mode, called SCHED_FIFO (acronym for First In-First Out in English terminology) under LINUX, the scheduler allocates full use of the processor, for an unspecified time, to the application ready to be executed and of highest priority. If several applications of the same priority are ready to be executed, they are managed by chronological order and the first on the list is executed until it is cut off. In this case, the next application on the list is executed. If an application of higher priority becomes ready, the application in the course of execution is preempted (it loses the allocation of the processor) and the one of higher priority is executed. The scheduler guarantees that such an application that has been preempted remains at the head of the list, to resume its execution ahead of the others as soon as the one having higher priority (in this example) has released, that is to say has stopped monopolizing the processor.

Neither of these two modes, however, is entirely satisfactory in a context of multitask operating systems where applications not constrained by design are executed concurrently. Moreover, during execution of applications in an environment such as the one presented above, load peaks estimated at 300% of the available processor capacity would be necessary to guarantee a rated performance. In this context of load peaks, a degraded performance of the system therefore is expected. Several solutions have been proposed to respond to this problem.

One solution thus consists in modifying the kernel of the operating system in order to limit the time for access to the processor for each application by static quota, for example in percentage of time for access to the processor on a given time slot. Such a solution, however, leads to an under-use of the processor.

Another solution, similar to the preceding one, consists in limiting the mean time for access to the processor for each application during a predetermined period according to values estimated dynamically. It therefore consists in assigning a dynamic quota calculated on a sliding window the mean effective (measured) consumption for which is slaved to a configured target quota. This solution, however, is difficult to define effectively and in particular presents convergence problems.

A need therefore exists to improve the management of access of applications to a computation unit, in particular to impart reliability to an on-board system having real-time constraints reliable and implementing a multitask operating system.

The invention makes it possible to resolve at least one of the problems set forth above.

The invention thus has as an object a method for supervising a scheduler for the management of processing time sharing in a multitask data-processing system comprising a computation unit having a standard execution mode and a preferred execution mode for executing a plurality of applications, this method comprising the following steps, dividing the execution time of the said plurality of applications into a plurality of periods;

determining a minimal time for access per period to the said computation unit for at least one application of the said plurality of applications;

for at least one period of the said plurality of periods, associating the said preferred execution mode with the said at least one application and executing the said at least one application according to at least the said minimal time for access to the said computation unit; and, associating the said standard execution mode with the applications of the said plurality of applications and executing at least any one of the applications of the said plurality of applications.

In this way the method according to the invention allows the execution of a set of applications by guaranteeing a time quota in preferred mode allowing at least one application to have a minimum of available computing capacity without modifying the kernel of the operating systems or the applications.

Advantageously, in order to avoid inducing edge effects on execution of the applications and to best distribute the computing capacity among the processes of an application, the said at least one application comprises at least two processes, the said step of associating the said preferred execution mode with the said at least one application comprising a step of associating the said preferred execution mode with each of the said at least two processes, the method further comprising a step of modifying the order of association of the said preferred execution mode with each of the said at least two processes of the said at least one application, when the said preferred execution mode is associated with the said at least one application, between two periods of the said plurality of periods.

According to a specific embodiment, still in order to avoid inducing edge effects on execution of the applications and in order to best distribute the computing capacity among the light processes of a process for an application, at least one of the said at least two processes comprises at least two light processes, the said step of associating the said preferred execution mode with the said at least one of the said at least two processes comprising a step of associating the said preferred execution mode with each of the said at least two light processes, the method further comprising a step of modifying the order of association of the said execution mode with each of the said at least two light processes, when the said preferred execution mode is associated with the said at least one application, between two periods of the said plurality of periods.

Still according to a specific embodiment, the method further comprises a step of determining a second minimal time for access per period to the said computation unit for at least one second application of the said plurality of applications, the said minimal access time being called first minimal access time and the said at least one application being called at least one first application, and, for the said at least one period, a step of associating the said preferred execution mode with the said at least one second application and executing the said at least one second application according to at least the said second minimal time for access to the said computation unit.

In this way the method according to the invention allows execution of a set of applications by guaranteeing to each one a time quota in preferred mode, thus allowing them to have a minimum of available computing capacity, without modifying the kernel of the operating system or the applications.

Advantageously, still in order to avoid inducing edge effects on execution of the applications, the method further comprises a step of modifying the order of association of the said preferred execution mode with the said at least one first and second applications, when the said preferred execution mode is associated with the said at least one first and second applications, between two periods of the said plurality of periods.

According to a specific embodiment, the said order of association of the said preferred execution mode with the said at least one first and one second applications is determined by an index on a list comprising references to the said at least one first and second applications, the value of the said index being modified at the end of each of the said periods. The method according to the invention thus is particularly simple to implement.

Still according to a specific embodiment, the method further comprises a step of detecting at least one periodic temporal interruption, the execution mode of at least one application of the said plurality of applications being determined at each detected interruption.

The invention also has as an object a computer program comprising instructions adapted for the implementation of each of the steps of the method described above when the said program is run on a computer, a device comprising means adapted for the implementation of each of the steps of the method described above as well as an aircraft comprising this device.

The advantages obtained with this computer program, this device and this aircraft are similar to those mentioned above.

Other advantages, purposes and characteristics of this invention become apparent from the detailed description that follows, presented by way of non-limitative example, with reference to the attached drawings in which:

FIG. 1, comprising FIGS. 1a and 1b, illustrates the general principle of the invention;

FIG. 2, comprising FIGS. 2a and 2b, schematically illustrates a part of a sequence for sharing of time for access to a computation unit, in accordance with the invention;

FIG. 3 shows a sequence of three consecutive periods during which the order of execution of the applications in the preferred execution mode undergoes a rotation at each period;

Figure 5A:
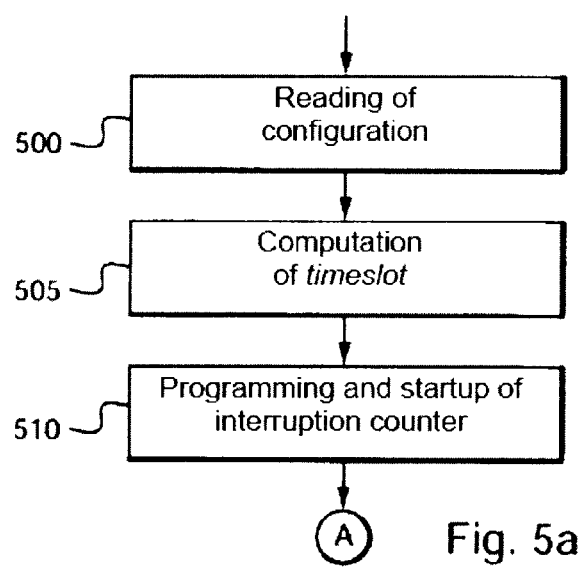
Figure 5B:
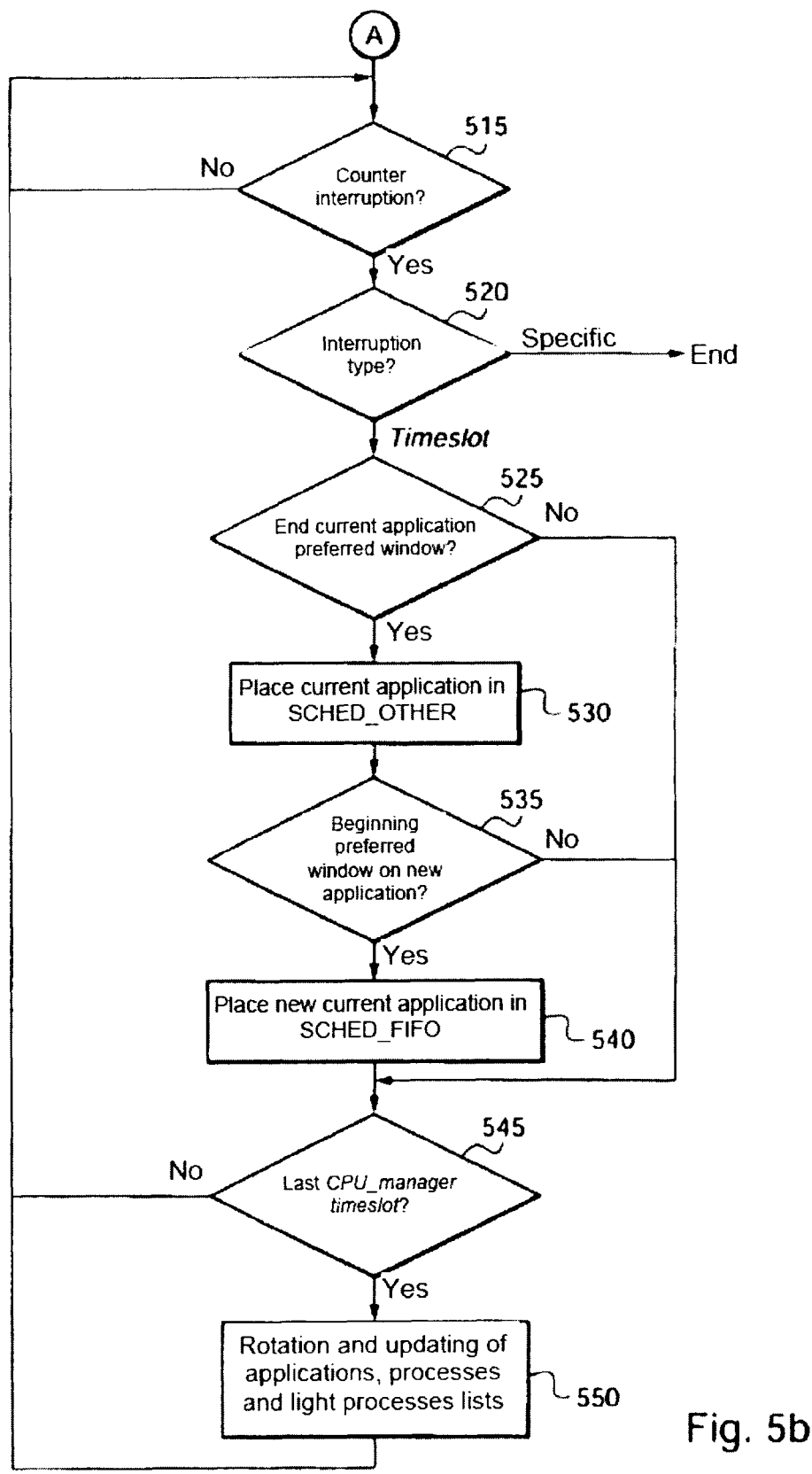
Figure 6:
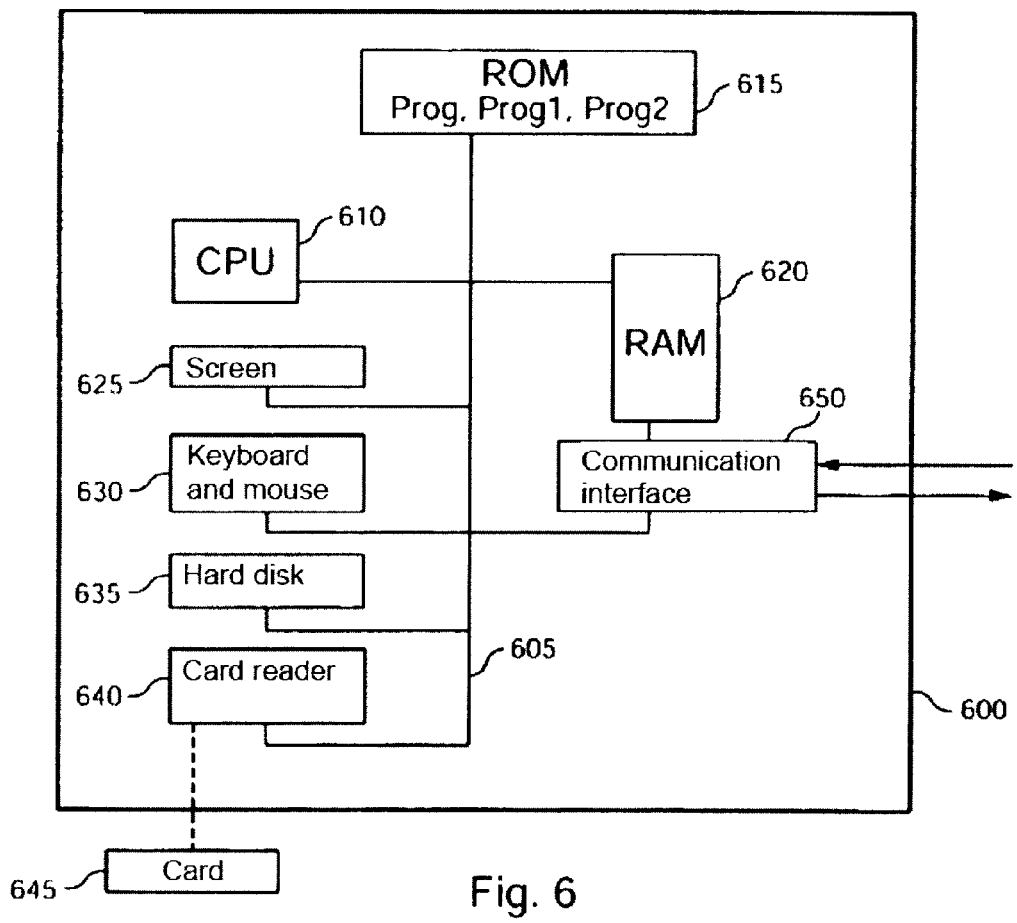

FIG. 5, comprising FIGS. 5a and 5b, illustrates an exemplary algorithm for managing time sharing of a computation unit, in accordance with the invention; and, FIG. 6 illustrates an exemplary hardware architecture adapted for implementing the invention.

In general, the invention has as an object to guarantee a minimal time for access per time unit (that is to say a minimal rate) to the computation unit used for certain applications executed (or a capacity level of this computation unit), making it possible to manage the high priorities of certain applications without ignoring the minimal needs of the other applications.

For these purposes, an algorithmic processing period is constructed in order to define the times for access to a computation unit, that is to say, here, to one or more processors. It comprises two parts. A first part is allocated to certain applications in a preferred execution mode, that is to say in a specific execution mode of the scheduler implemented in the operating system used, for example the SCHED_FIFO mode of the LINUX scheduler, while the second part is allocated to the applications according to the standard execution mode of the scheduler, for example the SCHED_OTHER mode of the LINUX scheduler.

The distribution of time (or of capacity) between these two parts is determined according to the needs of the applications executed in preferred execution mode. It advantageously may be definable, for example, in the form of a minimum reservation percentage for each application identified.

In this way, a part of the time (or of the capacity) of the computation unit is guaranteed for each application requiring it, while another part of the time (or of the capacity) of the computation unit is distributed in the usual manner (overall equally distributed) among all the executed applications.

Advantageously, the minimum sum of the times (or capacities) allocated in the part using the preferred execution mode is less than or equal to 100%. The time (or capacity) not allocated by the operating system in the preferred execution mode then is distributed to the applications executed in the standard mode.

It is seen that the task of time sharing management here always is executed in the preferred execution mode, with the highest priority level.

Figure 1A:
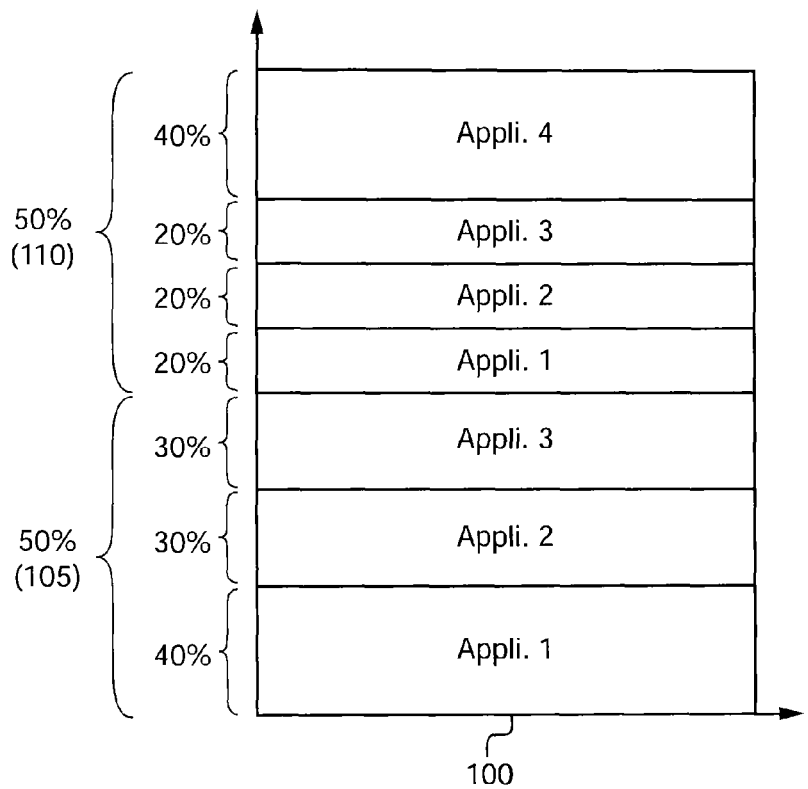
Figure 1B:
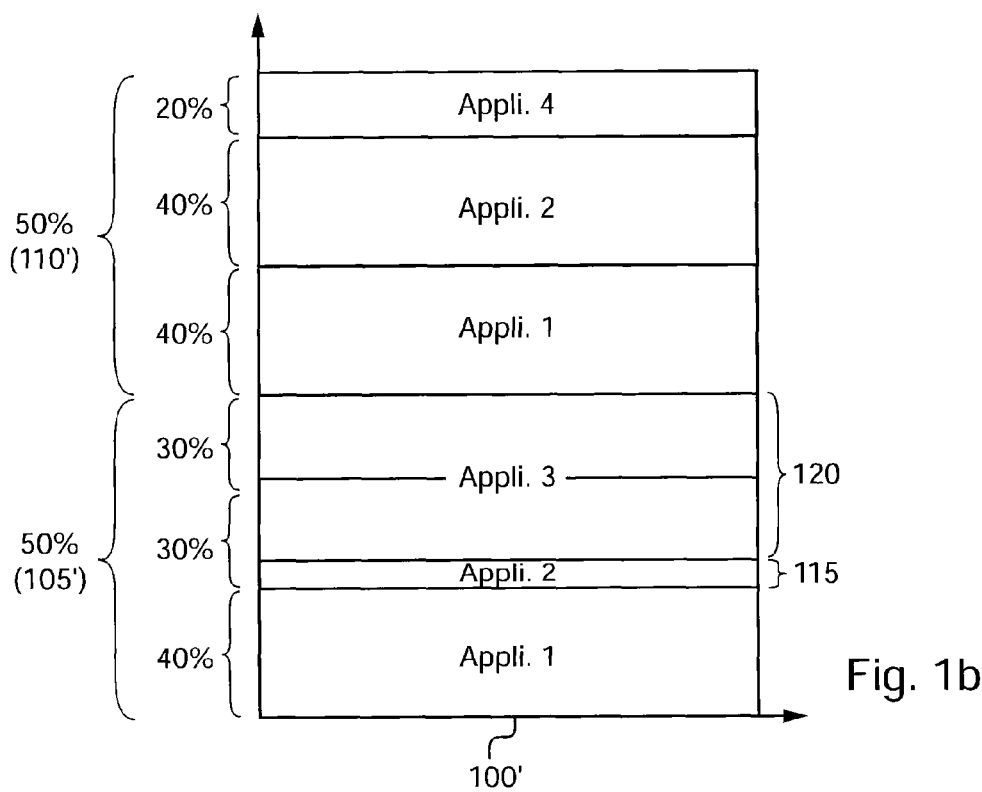

FIG. 1, comprising FIGS. 1a and 1b, illustrates the general principle of the invention when the use of the processors is close to one hundred percent. The Y axis here shows the capacity of the computation unit, able to be shown, for example, in the form of percentages of access time for a given period.

As illustrated on FIG. 1a, the time for access to the computation unit for a given period referenced 100 comprises a first part 105 during which the time for access to the computation unit is distributed among different applications so as to guarantee a minimum access time to each of them.

Management of the time for access to the computation unit is, for this first part 105, carried out in a preferred execution mode (or supervisor mode) so as to inhibit the standard allocation mechanism of the scheduler.

In this example, the minimum time allocated to application 1 is 40%, the minimum time allocated to application 2 is 30% and the minimum time allocated to application 3 is 30%. Each of these three applications here uses the entirety of the time that is allocated thereto.

Given time period 100 further comprises a second part 110 during which access to the computation unit is determined by a standard scheduler, for example in SCHED_OTHER mode. Management of the time for access to the computation unit thus is carried out in a standard execution mode.

In this example, the time allocated to applications 1, 2 and 3 is 20% for each one and the time allocated to application 4 is 40%.

It is seen that the distribution between the preferred and standard execution modes here is determined according to the needs of the applications executed in preferred execution mode. In this specific case, the capacity of the computation unit also is distributed between parts 105 and 110 (50% each).

FIG. 1b illustrates an exemplary implementation of the invention when an application does not use the entire minimum time that is allocated thereto in the preferred execution mode (that is to say when the time for access to the computation unit is distributed among different applications so as to guarantee a minimum access time to each of them). The CPU time not used by the preferred application is distributed among the other applications.

In this way, as illustrated and in accordance with the implementation shown on FIG. 1a, the time for access to the computation unit for a given period referenced 100' comprises a first part 105' during which the time for access to the computation unit is distributed among different applications so as to guarantee a minimum access time to each of these applications and a second part 110' during which access to the computation unit is determined by a standard scheduler. The capacity of the computation unit also still is distributed between the two parts (50% each).

Likewise, in part 105', the minimum time allocated to application 1 still is 40%, while the minimum time allocated to applications 2 and 3 still is 30% for each one. Nevertheless, whereas application 1 here actually uses the 40% that is reserved thereto, application 2 uses only 10% (reference 115). The unused reserved time then may be used by the other applications, here by application 3 which thus uses 50% (reference 120).

In part 110', the time allocated to applications 1 and 2 by the scheduler is 40% for each one and the time allocated to application 4 is 20%.

According to a specific embodiment, the time is divided into periods, called cpu_manager periods, each of these periods itself being divided into time units, called timeslots, according to interruptions of a periodic counter. Each of these interruptions corresponds to a call to the computation unit time sharing management task.

FIG. 2, comprising FIGS. 2a and 2b, schematically illustrates a part of a sequence for sharing of time for access to a computation unit, in accordance with the invention.

FIG. 2a illustrates such a temporal division. As shown, sequence 200 for sharing of time for access to a computation unit is divided into cpu_manager periods 205 which themselves are divided into timeslots numbered from 1 to 9 by period. It should be noted that if each period here comprises only 9 timeslots, it is merely for the sake of clarity and illustration, the number of timeslots per period typically ranging between 5 and 100.

FIG. 2b illustrates more precisely the format of a cpu_manager period 205-i here comprising three parts. Part 210 corresponds to the part during which the time for access to the computation unit is distributed among different applications, in a preferred execution mode, so as to guarantee a minimum access time to each of these applications. Part 215 corresponds to the part during which access to the computation unit is determined automatically and in standard manner by the scheduler. Finally, part 220, optional, corresponds in particular to control of the management of time sharing for the computation unit.

The windows thus are managed at each timeslot so as to determine whether it is necessary to change the application using the preferred execution mode. As described below, lists of processes and of light processes are updated at the end of the cpu_manager period, that is to say in the last timeslot (which is not dedicated exclusively to this task). It should be noted here that the updating of the lists of processes and light processes advantageously may be carried out every N cpu_manager periods. Finally, as described below, rotations preferably are performed on the lists of applications, processes and light processes at the end of the cpu_manager period, in the last timeslot.

In this example, cpu_manager period 205-I indicates that, during the execution phase in preferred mode, the computation unit is to allow the execution of application 1 during at least 1 timeslot, then application 2 during at least 5 timeslots and finally application 3 during at least 4 timeslots.

As indicated above, if an application does not use all the time that is dedicated thereto, the remaining time may be used by another application with which a minimum execution time moreover is associated.

According to a specific embodiment, management of the time sharing is accomplished by modifying, if necessary, the execution mode associated with each application (or more precisely with each task or process of each application). During each timeslot-type interruption, the time-sharing management task determines whether the preferred execution mode is to be used and, if it is to be, with regard to what application. The preferred execution mode is associated with the application to be executed in this mode, the standard execution mode being associated with all the other applications (with the exception of the time-sharing management task which is always in this mode, with the highest priority level).

Thus, for example, with reference to FIG. 2b, during interruption 0, the time-sharing management task determines that application 1 is to be executed in preferred mode. Application 1 then is placed in SCHED_FIFO mode (more precisely, all the processes making up this application and all the light processes of each of these processes are placed in SCHED_FIFO mode). All the other applications are placed in SCHED_OTHER mode (more precisely, all the processes making up these applications and all the light processes of each of these processes are placed in SCHED_OTHER mode).

Similarly, during interruption 1, the time-sharing management task determines that application 2 is to be executed in preferred execution mode. The SCHED_FIFO mode then is associated with application 2 while the SCHED_OTHER mode is associated with all the other applications. In practice, only application 1 preferably goes from SCHED_FIFO mode to SCHED_OTHER mode, all the others already being in SCHED_OTHER mode.

No mode change is introduced in interruptions 2 to 5.

Then, during interruption 6, the time-sharing management task determines that application 3 is to be executed in preferred execution mode. The SCHED_FIFO mode then is associated with application 3 while the SCHED_OTHER mode is associated with all the other applications, in particular with application 2 which was previously in SCHED_FIFO mode. Again, in practice, only application 2 preferably goes from SCHED_FIFO mode to SCHED_OTHER mode, all the others already being in SCHED_OTHER mode.

No mode change is introduced in interruptions 7 to 9.

It is seen here that, in a preferred execution window, an application remains in preferred execution mode whether or not it uses the resources of the processor or processors made available thereto. In this way, if it wishes to use these resources, it has priority during this window. If, for example, it performs input/output operations, it temporarily releases the processor or processors as a result of the systems calls involved. During these input/output operations, another application with lower priority therefore may access the resources of the processor or processors. Nonetheless, this second one is preempted at the end of the input/output operation by the preceding one which then resumes the course of its processing. The same is true if an application executed in the preferred execution mode temporarily releases, for example as a result of a Sleep (time)-type system call.

During interruption 10, the time-sharing management task determines that the execution time in preferred mode is ended. The SCHED_OTHER mode then is associated with all the applications.

In order not to induce edge effects on execution of the applications, the order of entry of the applications into the preferred execution mode preferably is changed at each cpu_manager period. In fact, it has been seen that the order of entry of the applications into the preferred execution mode influences their execution in the standard execution mode.

A rotation of the order of entry of the applications into the preferred execution mode thus advantageously is performed at each cpu_manager period.

By way of illustration, FIG. 3 shows a sequence of three consecutive cpu_manager periods during which the order of execution of the applications in the preferred execution mode undergoes a rotation at each period.

As illustrated, the order of execution of applications 1, 2 and 3 is modified between each of the cycles. For these purposes, a list management mechanism is used here. All the applications to be executed in the preferred execution mode are stored in a list that comprises an index designating the first application to be executed when the execution mode goes from the standard execution mode to the preferred mode. This index is incremented (modulo the number of applications present in the list) at each period end.

Table 1 provided herewith illustrates such a list comprising all the applications to be executed in preferred execution mode. As illustrated, an index, incremented at the end of each cpu_manager period, designates the first application to be executed when the preferred execution mode is implemented, here application 2.

The reference to the index to be used for a given period here is determined in the last timeslot of the preceding cpu_manager period reserved for the updating of the lists. By way of illustration, the first application to be executed when the preferred execution mode is implemented in cycle i+1 is determined during the period defined by the indication 220 of cycle i.

A similar mechanism advantageously is implemented for each process of each application executed in the preferred execution mode. As indicated above, the execution mode of a process is identical to that of the application to which it belongs (the execution mode of an application being defined by that of its processes). A list of processes is drawn up for each application. They are obtained, for example, with the aid of the appropriate control of the operating system. Each of these lists comprises an index designating the first process to be executed when the application to which it belongs is executed in the preferred execution mode. Just as for the list of applications, the starting index for each list of processes is incremented at the end of each cpu_manager period.

Table 2 provided herewith illustrates such lists comprising all the processes of each application to be executed in preferred execution mode. As illustrated, an index, incremented at the end of each period, designates the first process to be executed when the preferred execution mode is implemented, for each application.

Figure 4:
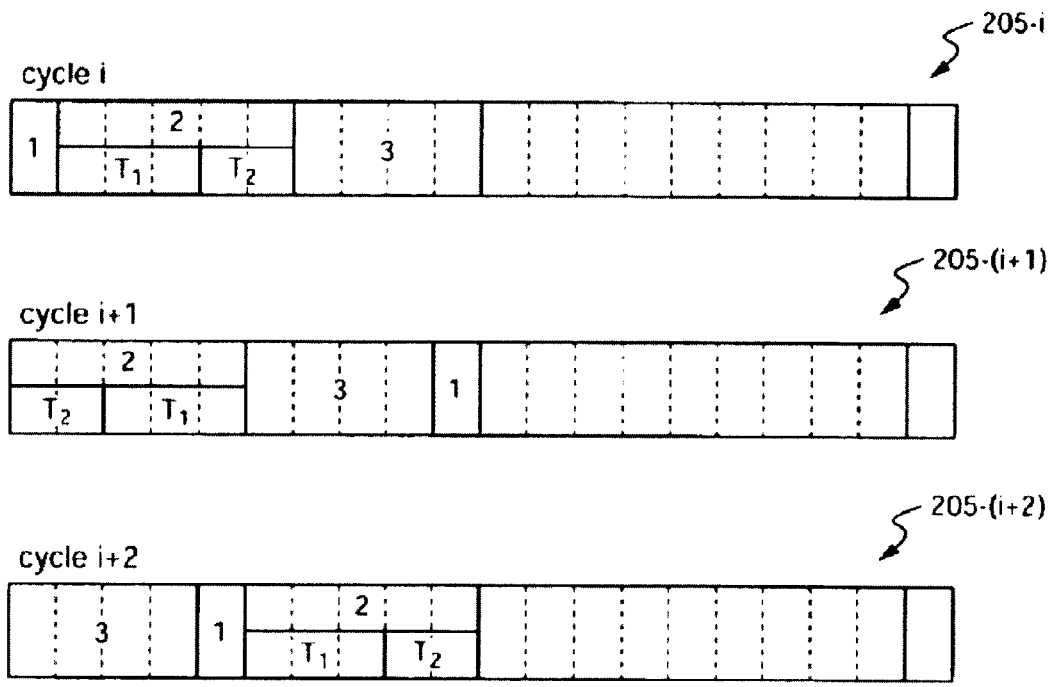
FIG. 4 illustrates the implementation of a mechanism for changing the order of changes of execution mode for tasks during the execution of applications similar to those presented with reference to FIG. 3.

FIG. 4 illustrates the implementation of this mechanism during the execution of applications similar to those presented with reference to FIG. 3. As shown, the order of entry into an execution mode (standard or preferred) of the processes called T1 and T2 is modified between each cpu_manager period.

As regards the order of the applications, the index of the first process to be executed, for each application executed in the preferred mode, preferably is determined during the last timeslot of the cpu_manager period.

Similarly, the processes may be divided into sub-tasks, also called light processes or threads in English terminology, the order of entry of the latter into an execution mode (standard or preferred) then advantageously being permutated at each period.

For a given process, however, since the number of light processes is potentially high, the order of the light processes preferably is managed by the lists the order of which varies in random manner.

FIG. 5, comprising FIGS. 5a and 5b, illustrates an exemplary algorithm for managing the time sharing of a computation unit, in accordance with the invention. FIG. 5a illustrates the initialization phase while FIG. 5b illustrates the phase of management of time sharing of the computation unit.

As illustrated on FIG. 5a, a first step has as an object to read the configuration of the system (step 500) so as to obtain, in particular, the cpu_manager period T, the list of the applications to be controlled, that is to say the list of applications with which a minimal capacity value of the computation unit is associated, and the minimal capacity value ($P_i$) of the computation unit to be assigned to each application (i), expressed in percentage.

Reading of the configuration also may apply to parameters linked to the rotation of the applications, their processes and their light processes. It involves, for example, an indicator having a predefined meaning. By way of illustration, the value zero of such an indicator may mean that no rotation is to be performed, the value 1 may mean that only a rotation on the applications is to be performed, the value 2 may mean that only a rotation on the applications and the processes is to be performed and the value 3 may mean that a rotation is to be performed on the applications, the processes and the light processes.

During the reading of the configuration, a test preferably is performed in order to verify that the sum of the minimal required capacity values of the computation unit does not exceed 100%, that is to say in order to verify the following relationship, $$\sum_i Pi \leq 100$$

The minimal time Ti to be allocated per period to each application (i) is determined according to cpu_manager period T and the minimal capacity value (Pi) of the computation unit to be assigned to each application (i), in the following manner, $$Ti = \frac{Pi}{100} \cdot T$$

in order to make it possible to place each application i in preferred execution mode in each cpu_manager period for $<n_i>$ timeslots ($T_i=<n_i>\times<$timeslot$>$ where $<$timeslot$>$ represents the temporal width of the timeslot).

Alternatively, the minimal capacity value (P'i) of the computation unit to be assigned to each application may be defined relatively according to a ratio (R) expressed between the execution period in preferred mode and the execution period in non-preferred execution mode. The minimal time Ti to be allocated to each application (i) then is determined in the following manner, $$Ti = \frac{P'i}{\sum_i P'i} \cdot R \cdot T$$

The size of the timeslot to be used, that is to say the frequency of call-up of the task of time sharing of the computation unit, is calculated in a following step (505) according to configuration data.

According to a specific embodiment, the timeslot is estimated according to the smallest common multiple (in terms of minimal execution time required) among the minimum percentages configured per application.

The task of time sharing management is placed in the preferred execution mode, with the highest priority level.

The list of processes is drawn up for each of the controlled applications. Similarly, the list of light processes is drawn up for each of the processes and each of the controlled applications. These lists in particular may be drawn up with the aid of the control 'ps-eL' under LINUS.

The interruption counter then is started (step 510) in order to make it possible to manage time sharing of the computation unit according to the algorithm illustrated on FIG. 5*b*. The process described with reference to this Figure is executed here as long as a specific interruption is not detected.

All the processes and light processes are placed in the SCHED_OTHER execution mode with the exception of the processes and the light processes corresponding to the first application to be executed in the preferred execution mode which are placed in the SCHED_FIFO execution mode.

When an interruption is detected (step 515), a test is performed in order to determine the type (step 520). If the interruption is of a specific type, the process ends.

If, on the contrary, the interruption is of the timeslot type, a test is performed in order to determine whether the interruption corresponds to the end of the window for preferred execution of the current application (step 525). If not, the algorithm continues to step 545 described below.

If, on the contrary, the interruption corresponds to the end of the window for preferred execution of the current application, the execution mode for the current application is changed. The current application is placed in standard execution mode, here in SCHED_OTHER mode (step 530). As indicated above, placing an application in a specific mode consists in placing each of its processes and each of its light processes in this execution mode. Thus all the processes and the light processes of the current application are placed in SCHED_OTHER mode.

A test then is performed in order to determine whether the interruption corresponds to the beginning of a window for preferred execution of another application (step 535). If not, the algorithm continues to step 545 described below.

If, on the contrary, the interruption corresponds to the beginning of a window for preferred execution of another application, the execution mode for the application following the current application in the list of the applications to be executed in preferred execution mode is changed in order to go over to preferred execution mode. This application becomes the current application. The current application thus is placed in SCHED_FIFO mode (step 540). More precisely, all the processes and the light processes corresponding to the current application are placed in SCHED_FIFO mode, one after the other (in as brief as possible a time interval) according to the order defined in the lists of the processes and the light processes, from the indexes. In this way, the processes and the light processes are processed by order of entry into the FIFO in order to allocate/withdraw the preferred execution mode thereto/therefrom.

A test then is performed in order to determine whether the interruption corresponds to the last temporal processing window (last timeslot) of the cpu_manager period in progress (step 545). As indicated above, this step also is performed if the interruption does not correspond to the end of the window for preferred execution of the current application (step 525) or if the interruption does not correspond to the beginning of a window for preferred execution of another application (step 535).

If the interruption does not correspond to the bottom of the cpu_manager period in progress, the above steps (steps 515 to 545) are repeated in order to process the following cpu_manager period or end the algorithm.

If, on the contrary, the interruption corresponds to the bottom of the cpu_manager period in progress, the lists of the applications, the processes and the light processes are updated and a rotation is performed (step 550). As indicated above, the rotations performed on the lists of the applications, processes and light processes may consist in incrementing indexes. These rotations are or are not performed depending on predetermined parameters linked to the user's choice.

More precisely, during this step, if necessary a rotation is performed in the list of applications, then the lists of processes and light processes are, if need be, updated for all the applications, according to the processes and light processes for each of them. Then, if necessary, a rotation is performed in the list of processes and a rotation (preferably random) is performed, if necessary, in the list of light processes.

The above steps (steps 515 to 550) then are repeated in order to process the following cpu_manager period or end the algorithm.

FIG. 6 illustrates an exemplary hardware architecture adapted for the implementation of the invention. Device 600, of on-board computer type for an aircraft, here comprises a communication bus 605 to which there are connected:
- a central processing unit or microprocessor 610 (CPU, abbreviation for Central Processing Unit in English terminology);
- a real-time clock for generating interruptions (not shown);
- a read-only memory 615 (ROM, acronym for Read Only Memory in English terminology) that can comprise the programs necessary for implementation of the invention;
- a random access or cache memory 620 (RAM, acronym for Random Access Memory in English terminology) comprising registers adapted for recording variables and parameters created and modified in the course of running the aforesaid programs; and
- a communication interface 650 adapted for transmitting and receiving data.

Device 600 also preferably has the following components:
- a screen 625 able to serve as a graphical interface with the user who will be able to interact with the programs, with the aid of a keyboard and a mouse 630 or another pointing device such as a touch screen or a remote control;
- a hard disk 635 that can comprise the aforesaid programs and data processed or to be processed according to the invention; and
- a memory card reader 640 adapted for receiving a memory card 645 and reading or writing therein data processed or to be processed according to the invention.

The communication bus permits communication and interoperability among the various components included in device 600 or connected thereto. The depiction of the bus is not limitative and, in particular, the central unit is able to communicate instructions to any component of device 600 directly or through another component of device 600.

The executable code of each program permitting the programmable device to implement the processes according to the invention may be stored, for example, on hard disk 635 or in read-only memory 615.

According to a variant, memory card 645 may contain data, in particular a table of correspondence between the events detected and the commands that may be requested, as well as the executable code of the aforesaid programs which, once read by device 600, is stored on hard disk 635.

According to another variant, the executable code of the programs will be able to be received, at least partially, through communication interface 650, to be stored in a manner identical to that described above.

More generally, the program or programs will be able to be loaded into one of the storage means of device 600 before being run.

Central unit 610 is going to control and direct the execution of the instructions or portions of software code of the program or programs according to the invention, which instructions are stored on hard disk 635 or in read-only memory 615 or else in the other aforesaid storage components. During boot-up, the program or programs that are stored in a non-volatile memory, for example hard disk 635 or read-only memory 615, are transferred to random access memory 620 which then contains the executable code of the program or programs according to the invention, as well as the registers for storing the variables and parameters necessary for implementation of the invention.

Naturally, to satisfy specific needs, an individual competent in the field of the invention will be able to apply modifications in the foregoing description.

TABLE 1

| Appli. 1 |
| → Appli. 2 |
| Appli. 3 |
| ... |
| Appli. n |

TABLE 2

| Appli. 1 | Process 1 |
| | → Process 2 |
| | ... |
| | Process i |
| Appli. 2 | → Process 1 |
| | Process 2 |
| | ... |
| | Process j |
| Appli, n | → Process 1 |
| | ... |
| | Process k |

The invention claimed is:

1. A method of supervising a scheduler for processing time sharing management in a multitask data-processing system comprising a computation unit that executes a plurality of applications, an access time for the computation unit being determined by the scheduler for each application of the plurality of applications, according to at least two separate execution modes, including a standard execution mode and a preferred execution mode, the method comprising:

dividing an execution time of the plurality of applications into a plurality of management periods;

determining a first minimal access time per management period to the computation unit for at least one first application of the plurality of applications; and for at least one management period of the plurality of management periods:

associating the preferred execution mode with the at least one first application, and executing the at least one first application according to at least the determined first minimal access time to the computation unit;

associating the standard execution mode with the applications of the plurality of applications other than the at least one first application associated with the preferred execution mode, and executing any one of the applications of the plurality of applications other than the at least one first application associated with the preferred execution mode; and repeating said associating the preferred execution mode and said associating the standard execution mode, said repeating including switching association of the preferred execution mode from the at least one first application to one of the plurality of other applications, and associating the standard execution mode with all of the plurality of applications other than said one other application.

2. The method according to claim 1,
wherein the at least one first application includes at least two processes, said associating the preferred execution mode with the at least one first application including associating the preferred execution mode with each of the at least two processes, and
wherein the method comprises modifying an order of associating the preferred execution mode with each of the at least two processes of the at least one first application, when the preferred execution mode is associated with the at least one first application, between a first set of two management periods of the plurality of management periods.

3. The method according to claim 2,
wherein at least one of the at least two processes includes at least two light processes,
wherein said associating the preferred execution mode with the at least one of the at least two processes includes associating the preferred execution mode with each of the at least two light processes, and
wherein the method comprises modifying an order of association of the execution mode with each of the at least two light processes, when the preferred execution mode is associated with the at least one first application, between a second set of two management periods of the plurality of management periods.

4. The method according to claim 3, wherein the first and second sets of two management periods are the same.

5. The method according to claim 2, wherein the first set of two management periods of the plurality of management periods are adjacent management periods.

6. The method according to claim 1, comprising:
determining a second minimal access time per management period to the computation unit for at least one second application of the plurality of applications; and
for the at least one management period, associating the preferred execution mode with the at least one second application, and executing the at least one second application according to at least the second minimal access time.

7. The method according to claim 6, comprising modifying an order of association of the preferred execution mode with the at least one first application and the at least one second application, when the preferred execution mode is associated with the at least one first application and the at least one second application, between two management periods of the plurality of management periods.

8. The method according to claim 7, wherein the order of association of the preferred execution mode with the at least one first application and the at least one second application is determined by an index associated with a list including references to the at least one first application and the at least one second application, a value of the index being modified at an end of each of the management periods.

9. The method according to claim 1, comprising detecting at least one periodic temporal interruption, an execution mode of one or more applications of the plurality of applications being determined at each periodic interruption detected.

10. A non-transitory computer-readable storage medium storing a program including computer-readable instructions that, when executed by a computer, cause the computer to perform the method according to claim 1.

11. A device adapted to perform the method according to claim 1.

12. An aircraft comprising the device according to claim 11.

13. The method according to claim 1, wherein the at least one first application remains in the preferred execution mode for a predetermined period whether or not the at least one first application uses available resources of the computation unit.

14. The method according to claim 1, wherein, for an input/output operation or for a sleep system call, the at least one first application temporarily releases the computation unit for the input/output operation or sleep system call, during which time another application of the plurality of applications with a priority lower then a priority of the at least one first application accesses available resources of the computation unit.

15. The method according to claim 1, comprising:
detecting an interruption indicating an end of the preferred execution mode; and
responsive to said detecting the interruption, associating all of the plurality of applications with the standard execution mode.

16. The method according to claim 1, wherein the method is performed without modifying a kernel of an operating system associated with the multitask data-processing system.

17. The method according to claim 1, wherein said associating the preferred execution mode with the at least one first application, and said associating the standard execution mode with the applications of the plurality of applications other than the at least one first application associated with the preferred execution mode are performed responsive to an interrupt.

18. The method according to claim 1, wherein said repeating is performed responsive to an interrupt.

* * * * *